United States Patent
Harcourt et al.

(10) Patent No.: US 7,246,853 B2
(45) Date of Patent: Jul. 24, 2007

(54) CHILD RESTRAINT APPARATUS FOR A VEHICLE

(75) Inventors: John A. Harcourt, Oklahoma City, OK (US); William C. Aven, Edmond, OK (US); William P. Munsell, Norman, OK (US)

(73) Assignee: Kidnetik Corp., Oklahoma City, OK (US)

( * ) Notice: Subject to any disclaimer, the term of this patent is extended or adjusted under 35 U.S.C. 154(b) by 0 days.

(21) Appl. No.: 11/170,516

(22) Filed: Jun. 29, 2005

(65) Prior Publication Data

US 2006/0001300 A1    Jan. 5, 2006

Related U.S. Application Data

(60) Provisional application No. 60/583,758, filed on Jun. 29, 2004.

(51) Int. Cl.
*A47D 1/10*        (2006.01)
*A47D 15/00*       (2006.01)
*A62B 35/00*       (2006.01)
*B60N 2/26*        (2006.01)

(52) U.S. Cl. .............. 297/250.1; 297/253; 297/256.16; 297/484

(58) Field of Classification Search ............ 297/250.1, 297/253, 256.15, 484, 256.16
See application file for complete search history.

(56) References Cited

U.S. PATENT DOCUMENTS 4,314,727 A * 2/1982 Potts ...................... 297/184.12
4,579,385 A * 4/1986 Koenig .................... 297/184.12
4,813,739 A * 3/1989 Miller ..................... 297/184.12
4,854,639 A * 8/1989 Burleigh et al. .......... 297/250.1
4,858,997 A * 8/1989 Shubin .................... 297/484 X
4,883,315 A * 11/1989 Ferguson ............... 297/184.12
4,911,498 A * 3/1990 Becher et al. .......... 297/184.12
5,031,962 A * 7/1991 Lee ............................ 297/484
5,094,506 A * 3/1992 Costa .................... 297/184.12
5,100,169 A    3/1992 Goor et al.
5,160,186 A * 11/1992 Lee ......................... 297/484 X
5,184,844 A    2/1993 Goor
5,375,908 A    12/1994 Goor
5,390,952 A    2/1995 Goor (Continued)

FOREIGN PATENT DOCUMENTS

EP    287259 A2 * 10/1988 .................. 297/484

*Primary Examiner*—Rodney B. White
*Assistant Examiner*—Stephen Vu
(74) *Attorney, Agent, or Firm*—Dunlap Codding & Rogers

(57) ABSTRACT

A child restraint apparatus having a base connectable to a vehicle. The base has a chassis with a back portion and a seat portion. /A U-shaped guard is pivotally connected to the chassis so as to be movable between an up position and a down position, in the down position the guard forming a frontal and lateral barrier around the child. A seat member of appropriate size is detachably connected to the seat portion of the chassis. A harness assembly is connected to the seat member. The harness assembly comprises a retractor assembly connected to the seat member and a torso strap having a lower end fixed to the retractor and a pair of upper ends connectable to a helmet via a latch assembly connected to the helmet. The helmet is adjustably connected to the chassis and has a rigid shell shaped to extend about at least a portion the head of the child.

47 Claims, 9 Drawing Sheets

U.S. PATENT DOCUMENTS

| | | | |
|---|---|---|---|
| 5,398,997 A * | 3/1995 | McFalls | 297/484 X |
| 5,466,044 A * | 11/1995 | Barley et al. | 297/253 X |
| 5,468,047 A | 11/1995 | Goor et al. | |
| 5,527,093 A * | 6/1996 | Park | 297/484 X |
| 5,549,356 A | 8/1996 | Gray | |
| 5,647,634 A | 7/1997 | Presser et al. | |
| 5,653,501 A | 8/1997 | Goor | |
| 5,681,094 A * | 10/1997 | Brown et al. | 297/484 |
| 5,704,684 A * | 1/1998 | Dukatz et al. | 297/238 |
| 5,733,003 A | 3/1998 | Goor | |
| 5,779,319 A | 7/1998 | Merrick | |
| 5,842,737 A | 12/1998 | Goor | |
| 5,899,534 A * | 5/1999 | Gray | 297/484 |
| 6,030,047 A * | 2/2000 | Kain | 297/484 |
| 6,042,181 A | 3/2000 | Goor | |
| 6,045,184 A * | 4/2000 | Nakagawa | 297/250.1 |
| 6,183,044 B1 * | 2/2001 | Koyanagi et al. | 297/256.16 |
| 6,375,260 B1 * | 4/2002 | Hiramatsu et al. | 297/256.16 |
| 6,378,950 B1 * | 4/2002 | Takamizu et al. | 297/484 |
| 6,386,632 B1 | 5/2002 | Goor et al. | |
| 6,464,294 B1 * | 10/2002 | Kain | 297/250.1 |
| 6,474,735 B1 * | 11/2002 | Carnahan et al. | 297/250.1 |
| 6,481,794 B1 * | 11/2002 | Kassai et al. | 297/250.1 |
| 6,485,055 B1 * | 11/2002 | Swayne et al. | 280/801.1 |
| 6,491,348 B1 * | 12/2002 | Kain | 297/484 |
| 6,623,074 B2 * | 9/2003 | Asbach et al. | 297/250.1 |
| 6,626,493 B2 * | 9/2003 | Kain | 297/250.1 |
| 6,672,664 B2 * | 1/2004 | Yanaka et al. | 297/256.16 |
| 6,679,550 B2 | 1/2004 | Goor et al. | |
| 6,688,685 B2 * | 2/2004 | Kain | 297/250.1 |
| 6,695,412 B2 * | 2/2004 | Barger et al. | 297/484 |
| 6,779,843 B2 * | 8/2004 | Kain | 297/250.1 |
| 6,820,939 B1 * | 11/2004 | Chen | 297/484 |
| 6,908,151 B2 * | 6/2005 | Meeker et al. | 297/250.1 |
| 6,916,066 B2 * | 7/2005 | Sedlack | 297/250.1 |
| 2001/0013719 A1 * | 8/2001 | Carine et al. | 297/484 |
| 2003/0047972 A1 * | 3/2003 | Burleigh et al. | 297/250.1 X |
| 2004/0212232 A1 * | 10/2004 | Sedlack | 297/250.1 |

* cited by examiner

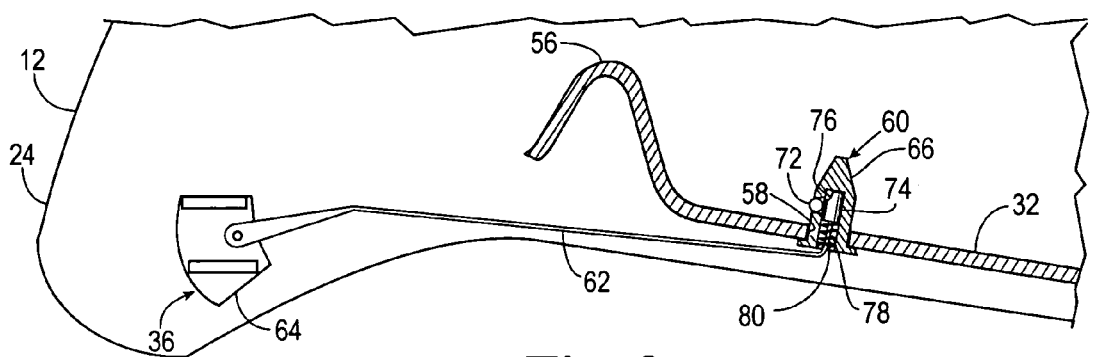
*Fig. 3*
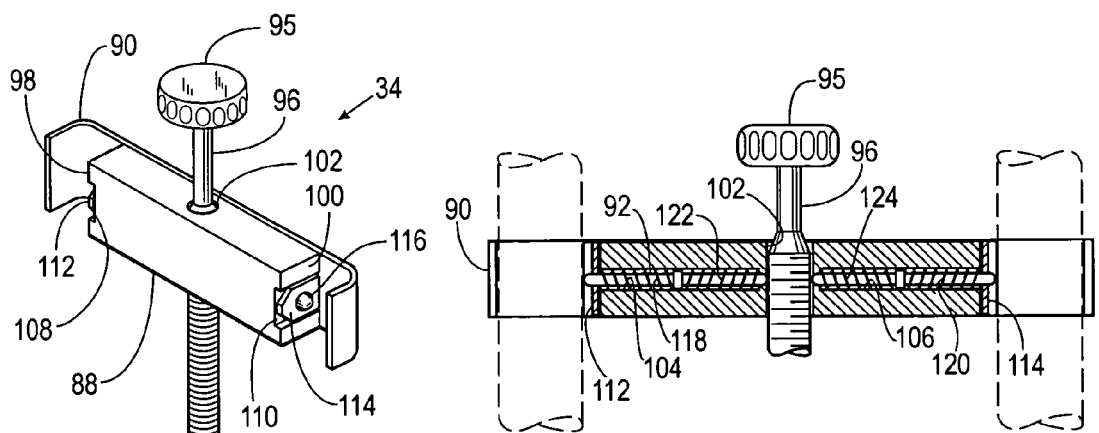
*Fig. 4*
*Fig. 5*
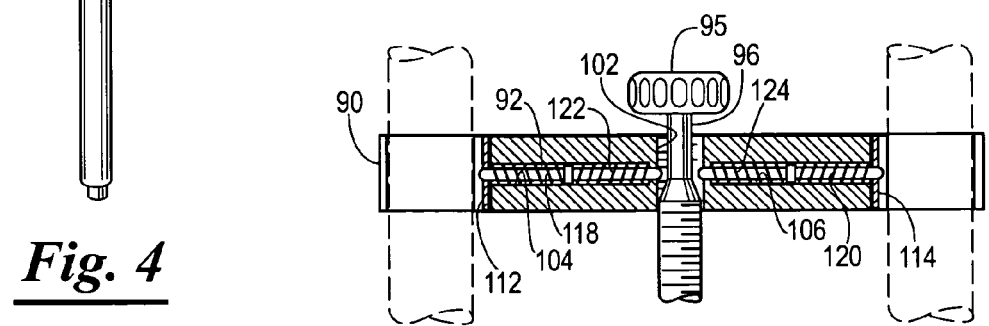
*Fig. 5a*

CHILD RESTRAINT APPARATUS FOR A VEHICLE

CROSS-REFERENCE TO RELATED APPLICATIONS

This application claims the benefit of U.S. Provisional Application Ser. No. 60/583,758, filed Jun. 29, 2004, the entire content of which is hereby expressly incorporated herein by reference.

BACKGROUND OF THE INVENTION

1. Field of the Invention

The present invention relates generally to passenger restraints, and more particularly, but not by way of limitation, to a child restraint apparatus for a vehicle.

2. Brief Description of Related Art

Child restraint devices are required by law to restrain children traveling in moving vehicles. There are three general classifications of child restraint devices: infant, convertibles, and booster seats. An infant restraint device typically is a product that doubles as a carrier and straps into the rear seat of a vehicle with the infant facing the rear. It generally accommodates infants up to about 22 lbs. A convertible device is designed to be strapped in either rear or front facing and accommodates infants and toddlers from 20 lbs. up to 35 lbs. (rear-facing) or up to 40 lbs. (front-facing). Finally, the booster seat is a device that raises the child passenger to a height so that the adult shoulder strap may cross the upper torso.

One problem encountered with the use of these devices is that as the child grows the current device is outgrown, provides no effective protection, and thus a new device must be used. Also, each device in itself must be periodically adjusted to accommodate changes in the size and weight of the child. For example, many devices are formed to include several sets of shoulder belt-receiving apertures in a back wall of the seat so that the device can be adapted by a an adult to restrain children of different sizes. To accommodate a child, the two shoulder belts are uncoupled from an anchoring structure and removed from the current apertures. The shoulder belts are then passed through another pair of shoulder belt-receiving apertures that are more appropriate from the size of the child and re-coupled to the anchoring structure. As the child grows, an adult must repeat the belt adjustment procedure described above using other higher sets of belt-receiving apertures formed in a higher portion of the back wall of the car seat to enlarge the child car seat harness to accommodate the growing child. This process is tedious and thus is often not performed as often as it should be. Furthermore, the location of the apertures may not provide maximum protection to the child.

With booster seats, correct placement of the adult shoulder strap is left to the child and in many instances children place the shoulder strap behind them providing no upper torso protection at all. Additionally, currently available child restraint devices do not provide adequate protection to the child passenger in the event of a side impact, rear impact, or a rollover. As a consequence, the child is at risk for serious injury.

To this end, a need exists for a child restraint apparatus that provides a secure, protective zone for the child occupant in all accident configurations—frontal, side, oblique, rear, and rollover—and which can be modified and adjusted to accommodate children of various sizes. It is to such a child restraint apparatus that the present invention is directed.

BRIEF DESCRIPTION OF THE SEVERAL VIEWS OF THE DRAWINGS

FIG. 3 is a partial cross sectional view of a portion of the base illustrating a latch assembly.

FIG. 4 is a perspective view of an actuator assembly.

FIG. 5 is a cross sectional view of the actuator assembly of FIG. 4.

FIG. 5A is a cross sectional view of the actuator assembly shown in an unlocked position.

DETAILED DESCRIPTION OF THE INVENTION

Figures 1, 2:
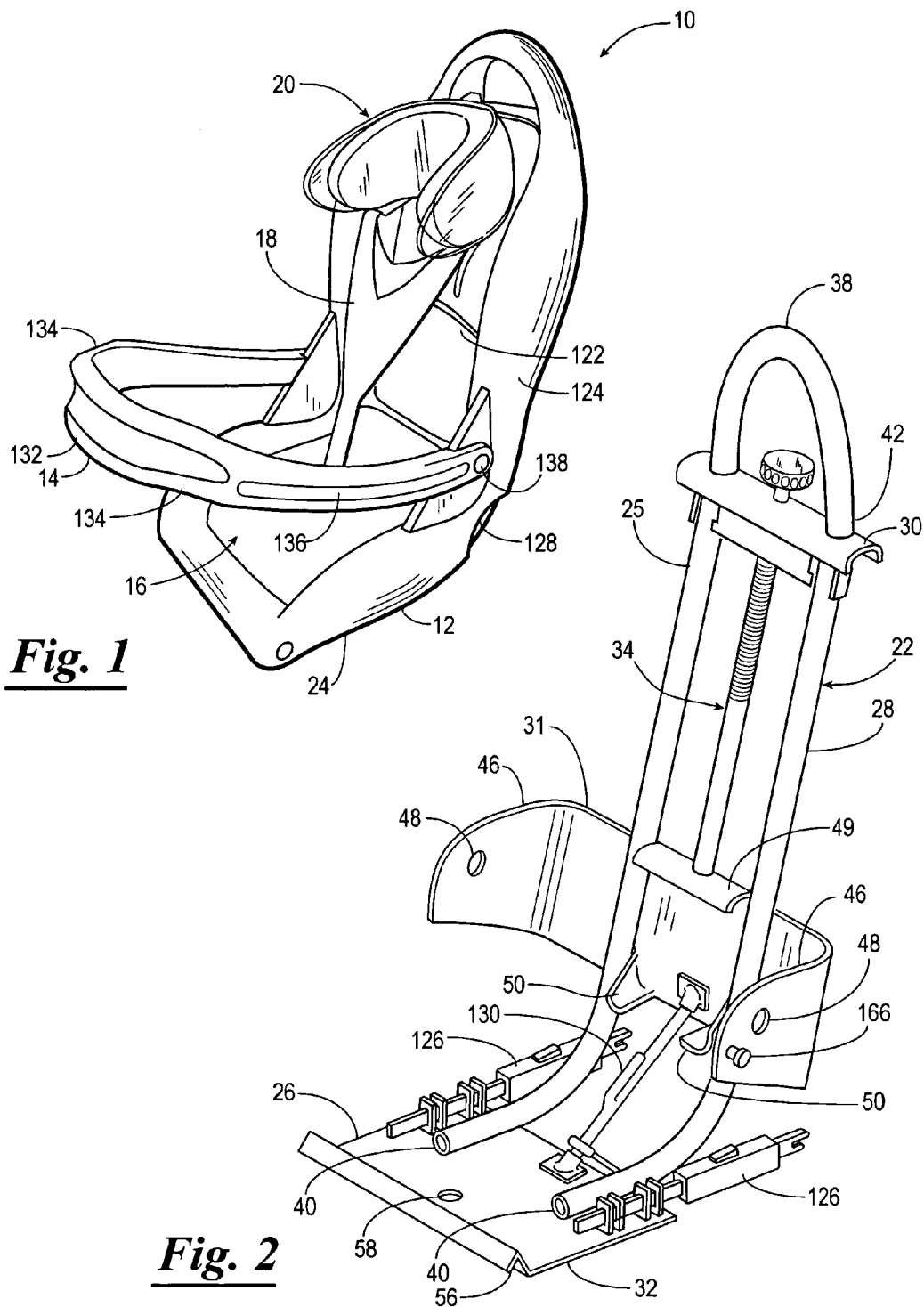
FIG. 1 is a perspective view of a child restraint apparatus constructed in accordance with the present invention.
FIG. 2 is a perspective view of a chassis.

Referring now to the drawings, and more particularly to FIGS. 1–3, a child restraint apparatus 10 adapted to be installed in a vehicle is shown. Broadly, the child restraint apparatus 10 includes a base 12 which connects to the vehicle, a guard 14 that is connected to the base 12 and forms lateral and frontal barriers around a child passenger, a seat assembly 16 which is detachably connected to the base 12 and which includes a harness assembly 18 for securing the child passenger, and a head protection assembly 20 adjustably connected to the base 12 to provide a barrier around and support for the child passenger's head. The child restraint apparatus 10 is designed to create a protection zone for children from birth to about five feet two inches and 102 pounds which is the size of the smallest person that may fit safely in an adult seat belt according to federal motor vehicle safety standards. The base 12 may be utilized in a single vehicle, or the base 12 can be moved and installed from vehicle to vehicle through quick connect and disconnect. The seat assembly 16 shown in FIG. 1 is only one of a series of size-appropriate, seat assemblies adapted to be used with the base 12. The seat assemblies 12 may range from a rear-facing infant carrier to forward-facing seats for children as tall as about sixty-two inches and weighing up to about 102 pounds.

Referring to FIGS. 1–5, the base 12 is the foundation of the child restraint apparatus 10 and includes a chassis 22 and an outer support structure 24 fastened to the chassis 12. As best shown in FIG. 2, the chassis 22 is generally L-shaped so as to be characterized as having a back portion 25 and a seat portion 26. More particularly, the chassis 22 includes a spine 28, a top cap 30, a guard hub support plate 31, a seat plate 32, an actuator assembly 34, and a seat latch assembly 36.

The spine 28 is constructed from a rigid member, such as steel tubing, to form a substantially double L-shaped member having a closed upper end 38 and a pair of lower ends 40. The spine 28 has a length so that the closed upper end 38 extends a distance above the head protection assembly 20 so as to function as a roll bar to provide protection in the event the vehicle inverts or rolls over. To increase the ability to resist loads during a rollover, the spine 28 has a bend 42 near the closed upper end 38 so that the closed upper end 38 is oriented substantially vertically or perpendicular to the roof of the vehicle when the base 12 is connected to a vehicle. The spine 28 further has a bend 44 at the lower end thereof.

The top cap 30, the guard hub support plate 31, and the seat plate 32 are fixed to the spine 28 in a suitable fashion, such as welding, so as to function as cross members which give rigidity to the spine 28. The top cap 30 further functions to support an upper end of the actuator assembly 34.

The guard hub support plate 31 is formed of a rigid material, such as steel, and is shaped to define a pair of arms 46 provided with holes 48 for receiving the guard 14 in a manner to be described below. The guard hub support plate 31 further includes an upper tab 49 to which a lower end of the actuator assembly 31 is connected and a pair of lower tabs 50 which serve to help secure the seat assemblies 16 to the base 12 in a manner that will also be described below. The lower tabs 50 are positioned near the top of the bend 44, and each lower tab 50 includes a horizontal portion and a gusset portion.

The seat plate 32 is constructed of a rigid material, such as steel, and is sized to support the seat assembly 16. The seat plate 32 is provided with an upward fold 56 at a forward end thereof to provide additional rigidity and impede buckling of the seat plate 32 upon loads being transferred to the seat plate 32 by the seat assembly 16. The seat plate 32 is further provided with an opening 58 for receiving a portion of the seat latch assembly 36. The seat plate 32 is fixed to the lower ends 40 of the spine 28.

Referring to FIG. 3, in one embodiment the seat latch assembly 36 includes a catch assembly 60, a flexible cable 62, and a release handle 64. The catch assembly 60 has a body 66 with a conical top 68 to promote self-centering of the seat assembly 16. The body 66 has an opening 70 sized and shaped to retain a ball 72. The ball 72 is caused to extend beyond the body 66 by a blocker 74 housed by the body 66. The blocker 74 has a recess 76 which allows the ball 72 to move inwardly when the blocker 74 is moved to a position wherein the recess 76 is adjacent the ball 72. The blocker 74 is biased in a blocking position by a spring 78. The blocker 74 and the spring 78 are retained in the body 66 by a plug 80 which has a hole for receiving the cable 62.

The cable 62 is passed through the hole and has one end connected to the blocker 74 and the other end connected to the release handle 64. The release handle 64 is positioned in a track (not shown) formed in the outer support structure 24 of the base 12 whereby the release handle 64 travels in a to and fro direction. Pulling of the release handle 64 in a forward direction causes the blocker 74 to be moved downwardly thereby positioning the recess 76 of the blocker 74 adjacent the ball 72 and allowing the ball 72 to move inwardly to a release position. The use of the flexible cable 62 has the advantage that a front impact load on the base 12 will cause the cable 62 to slacken thereby preventing the seat latch assembly 32 from being inadvertently activated to the release position.

Referring now to FIGS. 2, 4, and 5, the actuator assembly 34 is shown. The actuator assembly 34 serves to support the head protection assembly 20 and adjust the position of the head protection assembly 20 along the back portion 25 of the chassis 22 so that the head protection assembly 20 may be properly positioned around the child passenger. In one embodiment, the actuator assembly 34 includes a jackscrew 86, a traveling block 88, a retention plate 90, a first retention pin 92, and a second retention pin 94.

The jackscrew 86 has an upper end supported by the top cap 30 and a lower end supported by the guard hub support plate 31. The upper end of the jackscrew 86 has a knob 95 connected thereto for rotating the jackscrew 86, and the upper end is provided with an area of reduced diameter 96, the function of which will be described below in reference to use of the head protection assembly 20.

The traveling block 88 is preferably constructed of a suitable rigid polymeric material, such as nylon or the like. The traveling block 88 has a first side 98, an opposing second side 100, and a threaded opening 102 in which the jackscrew 86 is received so that the traveling block 86 moves longitudinally along the back portion 25 of the chassis 22 in response to rotational movement of the jackscrew 86. The traveling block 88 further has a first bore 104 (FIG. 5) extending from the first side 98 to the threaded opening 102 and a second bore 106 extending from the second side 100 to the threaded opening 102. The first side 98 of the traveling block 88 has a first slot 108, and the second side 100 has a second slot 110.

The retention plate 90 is connected to the traveling block 88 for transferring loads to the spine 28 from the head protection assembly 20. As such, the retention plate 90 is constructed of a rigid material, such as steel, as is shaped to extend about each side of the spine 28. More specifically, the retention plate 90 is a generally flattened, U-shaped member having a first tine 112 and a second tine 114 extending therefrom in a spaced apart relationship. The first tine 112 and the second tine 114 each have a pin receiving opening 116. The first tine 112 and the second tine 114 are spaced apart a distance such that the first tine 112 may be positioned in the first slot 108 of the traveling block 88 with the pin receiving opening 116 of the first tine 112 in alignment with the first bore 104 of the traveling block 88 and the second tine 114 may be positioned in the second slot 110 of the traveling block 88 with the pin receiving opening 116 of the second tine 114 aligned with the second bore 106. While the retention plate 90 is described as being manufactured as a separate piece from the traveling block 88, it will appreciated that the two may be manufactured as single piece.

FIG. 5 shows the actuator assembly 34 in a locked position. The retention plate 90 is secured to the traveling block 88 by the first retention pin 92 and the second retention pin 94. The first retention pin 92 is positioned in the first bore 104 and biased toward the jackscrew 86 by a spring 118. The first retention pin 92 is dimensioned so that one end of the first retention pin 92 engages the jackscrew 86 and the other end extends through the pin receiving opening 116 of the first tine 112 of the retention plate 90 a distance to function as a catch for the head protection assembly 20 in the locked position of the actuator assembly 34. Likewise, the second retention pin 94 is positioned in the second bore 106 and biased toward the jackscrew 86 by a spring 120. The second retention pin 94 is dimensioned so that one end of the second retention pin 94 engages the jackscrew 86 and the other end extends through the pin receiving opening 116 of the second tine 114 of the retention plate 90 a distance to function as a catch for the head protection assembly 20 in the locked position of the actuator assembly 34.

Referring now to FIG. 5A, the actuator assembly 34 is shown in an unlocked position. A first and second retention pins 92 and 94 are each supported by a second spring 122 and 124, respectively. The second springs 122 and 124 function to resiliently support the retention pins 92 and 94 when the retention pins 92 and 94 are positioned adjacent the area of reduced diameter 96 of the jackscrew 86 so that the retention pins 92 and 94 function as quick connectors with respect to the head protection assembly 20 to be described below. More specifically, when the jackscrew 86 is rotated to cause the traveling block 88 to be moved to the area of reduced diameter 96, the springs 118 and 120 urge the retention springs 92 and 94 toward the jackscrew 86. However, the springs 122 and 124 resist the retention pins 92 and 94 moving into engagement with the area of reduced diameter 96 of the jackscrew 86 so that the retention pins 92 and 94 are resiliently supported.

To function as quick connectors, the ends of the retention pins 92 and 94 are provided with a radius. The retention pins 92 and 94 are dimensioned so that while the retention pins 92 and 94 have moved toward the jackscrew 86, the ends of the retention pins 92 and 94 extend beyond the first tine 112 and the second tine 114 when the traveling block 88 is positioned adjacent the area of reduced diameter 96 so as to secure the retention plate 90 but maintain the ends exposed to be engaged by the head protection assembly 20.

Referring again to FIG. 1, the outer support structure 24 of the base 12 includes a slotted back cushion 122 (FIG. 1) that is connected to and extends over a substantial portion of the back portion 25 to function as a back support. A side cushion 124 extends along each side of the chassis 22 to provide additional protection against side impact collisions. The back cushion 122 and the side cushion 124 are preferably constructed of a foam material covered by an outer fabric and supported by an internal shell or frame. The internal frame is connected to the chassis 22 in a suitable manner, such as with fasteners.

In one embodiment, the chassis 22 may be provided with a hinge so that the seat portion 26 and the back portion 25 are capable of being folded relative to one another to facilitate insertion of the base 12 into the vehicle and removal of the base 12 from the vehicle.

Loose connections between a child seat and the vehicle are cited in the National Occupant Protection Use Survey (NOPUS) reports as one of the two most common misuses made by more than 80% of parents or care givers. Therefore, the base 12 of the child restraint apparatus 10 is first installed into one of the rear seating positions in the vehicle. The installation can be conveniently done in one of two ways. For vehicles with Lower Anchor and Tethers for Children (LATCH) Anchors (manufactured after 2002 model year), the base 12 may be attached directly to the 6 mm bars of the vehicle anchor via latch mechanisms 126 extending from the chassis 22. This is a quick snap-in connection. The other installation method, for vehicles manufactured before 2002, is the conventional lap or lap/shoulder belt 127 passing through an opening 128 (FIG. 14) in the base 12 and over the bend 44 of the spine 28. To facilitate proper installation, a web tightening assembly 130 (illustrated in FIG. 2) may be connected to the chassis 22 to snug the chassis 22 to the vehicle seat. The web tightening assembly 130 may include a lever and a ratchet mechanism and a web grabbing member for gripping the webbing of the seat belt so that the webbing may be made more taut upon rotation of the ratchet mechanism. The chassis 22 may be shaped to substantially conform to the contour of the seat of the vehicle to provide a more secure attachment to the vehicle. A conventional tether strap (not shown) may be connected to the upper end of the chassis 22 for use in vehicles manufactured after 1988. The use of the tether strap would establish a three-point attachment system and help maximize the stability and connection of the chassis 22 to the vehicle.

Figure 12:
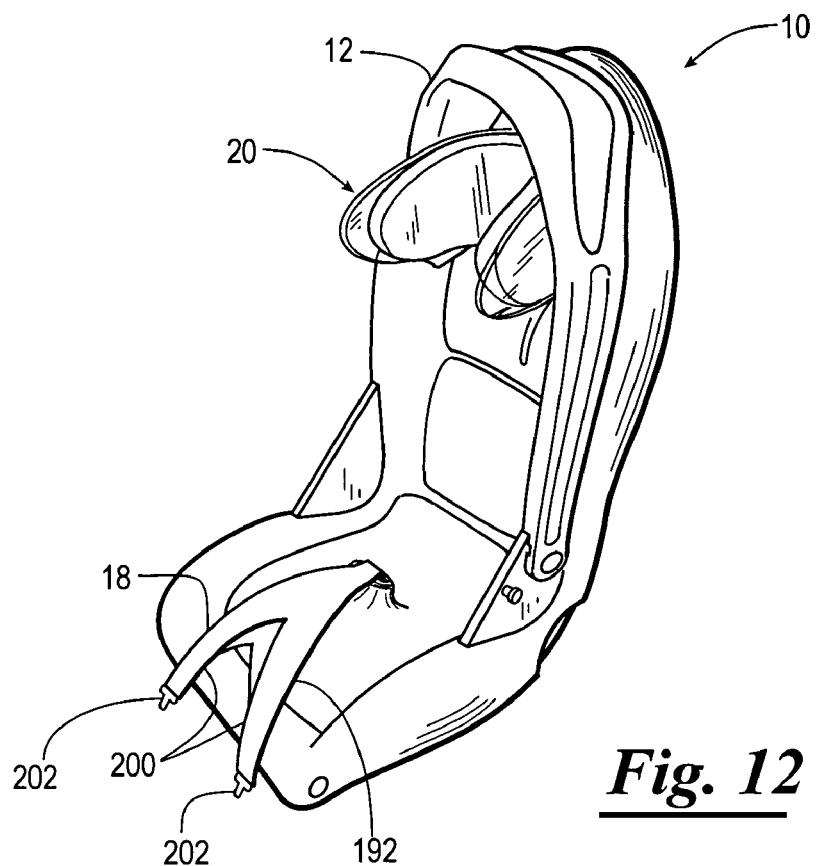
FIG. 12 is a perspective view of the child restraint apparatus of the present invention showing the guard in an up position and a harness assembly in an unlatched position.
Figure 14:
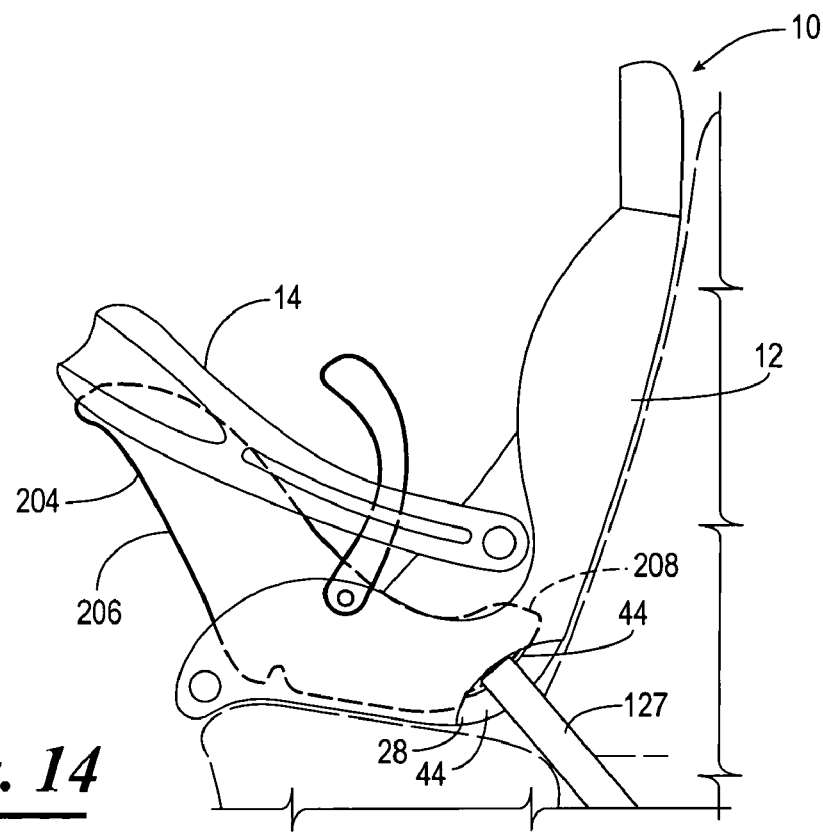
FIG. 14 is a side elevational view of the child restraint apparatus with a rear-facing seat assembly shown to be an infant carrier.

Referring now to FIGS. 1, 12, and 14, the guard 14 is a substantially U-shaped, rigid member that is connected to the chassis 22 and movable between an up position (FIG. 12) and a down position (FIG. 1). In the down position, the guard 14 reinforces the zone around the child passenger to protect against frontal and side impacts. The guard 14 is positioned relative to the base 12 so that in the down position, the guard 14 is locked in a position that is substantially perpendicular with respect to the back of the front seat of the vehicle upon the front seat rotating backwards about its pivot axis to prevent the front seat from collapsing onto the child passenger during rear impacts. Furthermore, the guard 14 is preferably dimensioned so that a leading end 132 of the guard 14 is positioned near the back of the front seat to limit the momentum created when the front seat collapses due to force generated by a rear impact at greater than about 25 mph. To this end, when in the down position, the guard 14 extends at a generally upward angle, as best shown in FIG. 1, and the leading end 132 of the guard 14 is provided with side scoops 134 that facilitate the guard 14 fitting between front seats of a vehicle. The guard 14 may be constructed to be selectively extendible and retractable so that it may accommodate adjustments to the position of the front seat. To the same degree, if the child restraint apparatus 10 is installed in the front seat, the guard 14 is positioned to protect against an air bag deployment. The leading end 132 is further flared to better disperse loads from a range of air bags. Additionally, as shown in FIG. 1, the sides of the guard 14 are provided with a longitudinal groove 136 which allows the side of the guard 14 to interlock with the guard 14 of an adjacent child restraint apparatus 10 upon the occurrence of a side impact, thereby reducing the possibility of the guard 14 of one child restraint apparatus 10 sliding past the guard 14 of the other restraint apparatus 10 and causing injury to the child passenger. The guard 14 has a generally upward curved profile which allows the guard 14 to substantially conform to the contour of the back portion of the base 12 when the guard 14 is in the up position to facilitate positioning in and removal from the child restraint apparatus 10.

Figure 6:
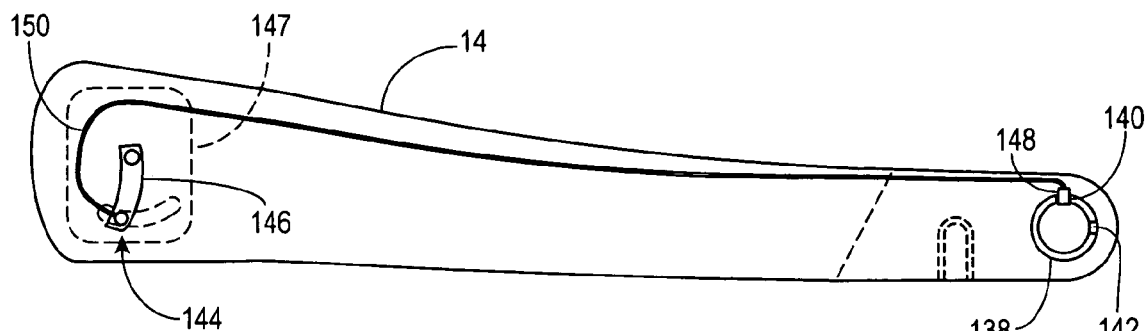
FIG. 6 is a side view of a guard.
Figure 7:
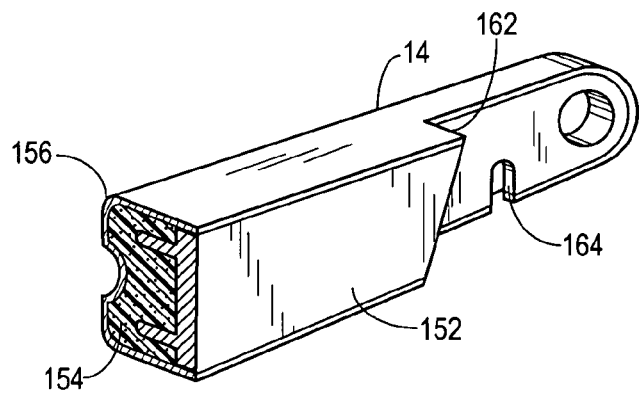
FIG. 7 is a sectional perspective view of the guard.
Figure 8:
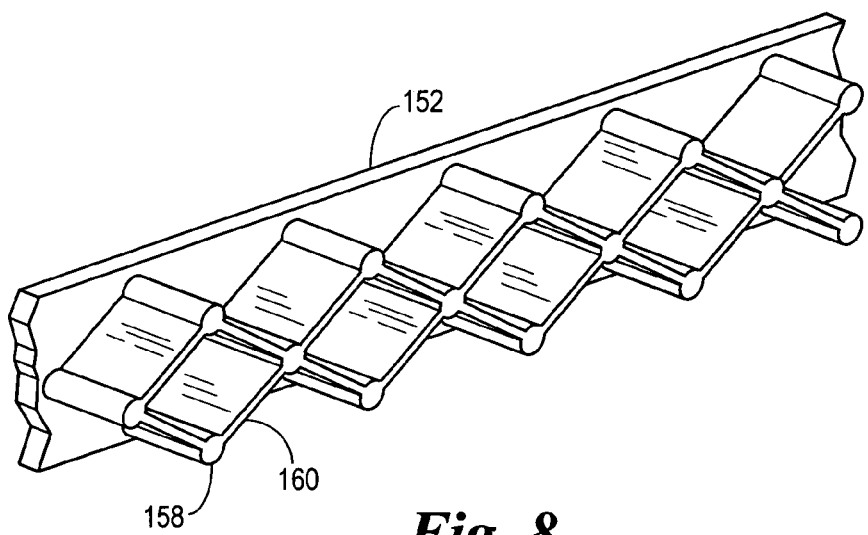
FIG. 8 is a perspective view of a portion of a stiffening member of the guard.

Referring to FIGS. 6–8, the guard 14 is pivotally attached to the arms 46 of the guard hub support plate 31 via a hub 138 received in the holes 48 of the arms 46 of the guard hub support plate 31. The hubs 138 are provided with a first detent hole 140 and a second detent hole 142 for receiving a latching mechanism 144 adapted to latch to the guard 14 in the down position (FIGS. 1 and 6) and the up position (FIG. 14). The latching mechanism 144 has a latch release handle 146 mounted in a housing 147 so that the latch release handle 146 is preferably positioned out of reach of the child passenger and that permits the guard 14 to be latched and unlatched and raised and lowered with a one-hand operation. The latch release handle 146 is shown if FIG. 6 as being positioned at the leading end of the guard 14 on the underside thereof. However, it will be appreciated that the latch release handle 146 may be positioned in a variety of suitable positions. The latch release handle 146 is preferably recessed and operated by pull action to prevent impact/intrusion from activating the latch release handle 146. The latch release handle 146 is connected to a pair of spring-loaded pins 148 via cables 150 extending through the guard 14 (only one of the pins 148 and the cables 150 being depicted in FIG. 6). The spring-loaded pins 148 are adapted to be received in the first detent hole 140 and the second detent hole 142 of the hub 138 to secure the guard 14 in the down position and the up position, respectively. The spring-loaded pins 148 are preferably oriented to minimize inertial effects on the spring-loaded pins 148 that arise especially during impacts. As such, the spring-loaded pins 148 are preferably vertically oriented.

Referring to FIGS. 7 and 8, the guard 14 includes a structural support member 152, a cushioning layer 154, and an outer cover 156. The structural support member 152 is substantially U-shaped and fabricated of a rigid material, such as plastic, steel, or combination thereof. The outer surface of structural support member 152 is molded to have a series of posts 158 and crossed strips 160. The posts 158 may be threaded to be used to mount additional strengthening features, if needed, or other features, such as entertainment features to the structural support member 152, while the crossed strips 160 function as stiffening members.

It should be appreciated that the inner surface of the guard 14 may further be constructed in a similar fashion, thereby facilitating acceptance of a variety of accessories to keep the child passenger's attention stimulated during long trips. These accessories range from simple mobiles and rattles, to hand-held electronic games. A sole adult driver may utilize a mini-cam on the guard 14 that transmits to a rear view mirror mounted monitor so the infant passenger may be seen while maintaining safe operation of the vehicle.

As shown in FIG. 7, the structural support member 152 is provided with a shoulder 162 shaped to mate with the arms 46 of the guard hub support plate 31 when the guard 14 is in the down position. To provide additional support to the guard 14, the structural support member 152 further includes a slot 164 for receiving a locking pin 166 (FIG. 2) extending from the arms 46 of the guard hub support plate 31.

The cushioning layer 154 functions to further absorb impact energy and as a protective padding to prevent injury should an individual impact the guard 14. The outer cover 156 may be a fabric that assists to secure the cushioning layer 154 and serves as a further protective padding.

After the base 12 with the guard 14 is installed onto the vehicle rear seat, an appropriate sized seat assembly 16 is secured to the base 12. To allow the child restraint apparatus 10 to accommodate a growing child, multiple seat assemblies 16 are made available. By way of example, the seat assemblies may include rear-facing seat assemblies, including an infant carrier, and different sizes of forward-facing seat assemblies. In addition, the forward-facing seat assemblies are used in combination with an appropriate sized head protection assembly 20.

Figure 9:
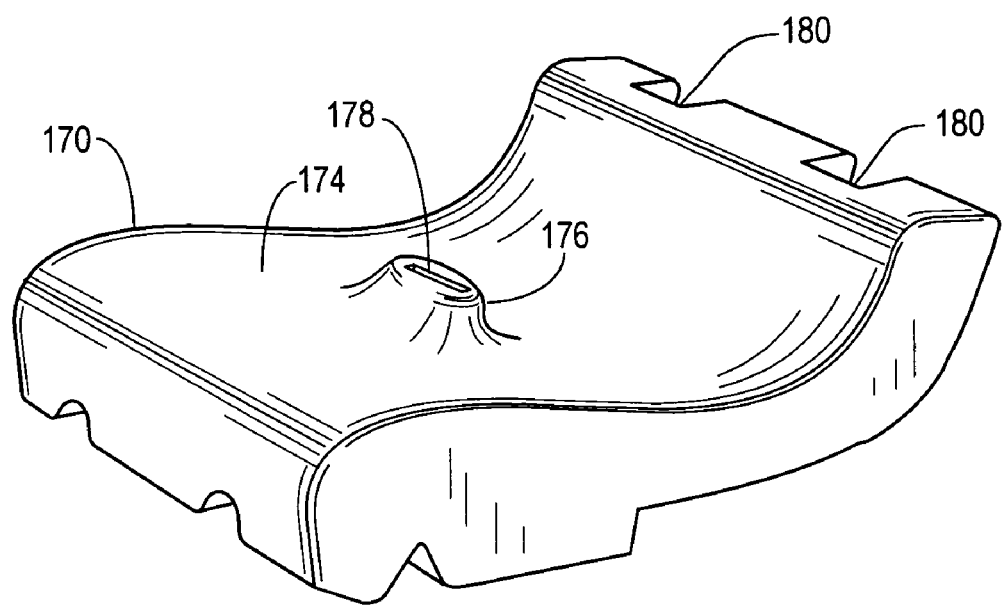
FIG. 9 is a top perspective view of a forward-facing seat member.
Figure 10:
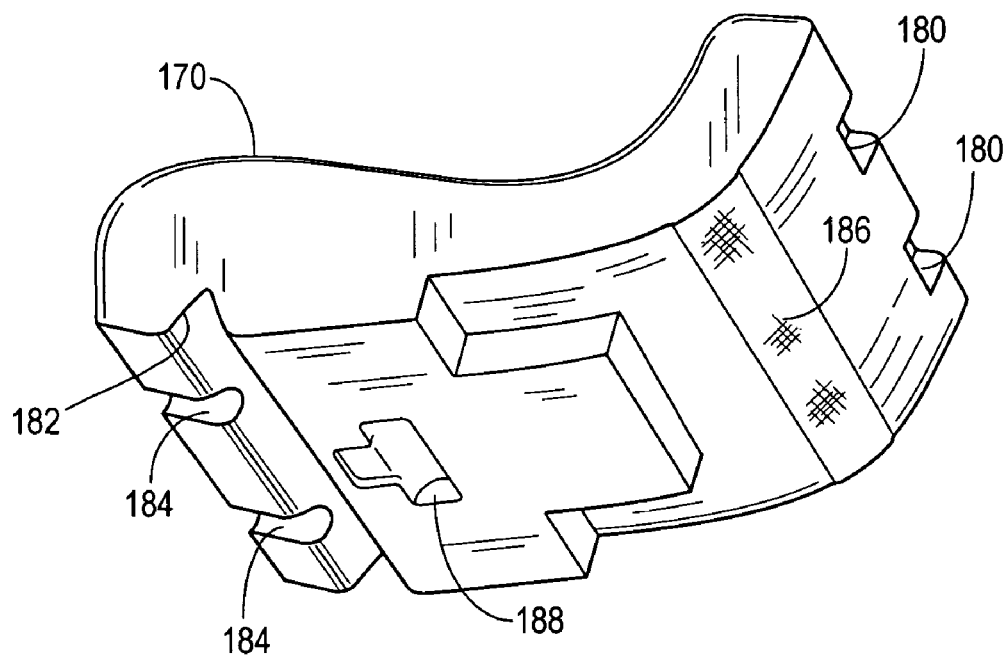
FIG. 10 is a bottom perspective view of the forward-facing seat member of FIG. 9.
Figure 11:
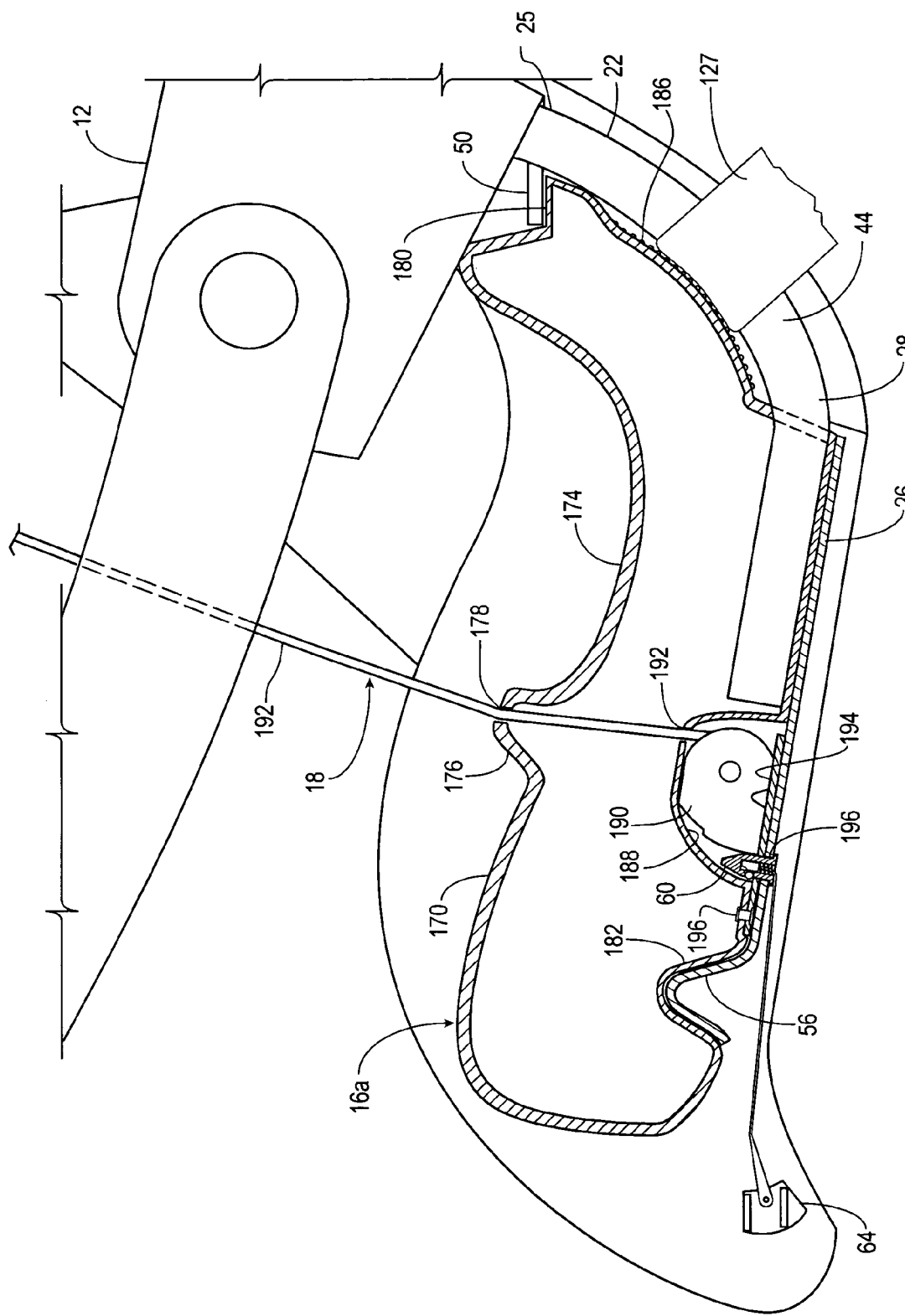
FIG. 11 is a partial cross sectional, side elevational view showing a forward-facing seat assembly shown connected to the base.

Referring now to FIGS. 9–11, a forward-facing seat assembly 16a (FIG. 11) is illustrated. The forward-facing seat assemblies are designed for specific ranges of height and weight to accommodate child passengers as they grow. Forward facing seat assemblies, such as seat assembly 16a, are secured to both the back portion 25 and the seat portion 26 of the chassis 22.

More particularly, the seat assembly 16a includes a seat member 170 and the harness assembly 18. As shown in FIG. 9, the seat member 170 has an upper surface 174 contoured to create a saddle that prevents sloughing and prevent child passengers from submarining out of the protection zone, as well as lateral movement of the child passenger. The upper surface 174 further includes a horn 176 positioned to extend from the crotch of the child passenger. The 176 horn includes a slot 178 through which the harness assembly 172 passes. Prevention of submarining is accomplished by forming the saddle to a desired angle and height whereby the saddle acts as a cushion and, in conjunction with the horn 176 and the harness assembly 172, a barrier to prevent submarining. To prevent the child passenger's legs from "going to sleep" on long trips, the saddle is further contoured at the front end to reduce pressure points that impinge nerves and blood vessels under the thighs.

The seat member 170 has a rear end formed to have a pair of landings 180 that are adapted to be captured by the horizontal portions of the lower tabs 50 of the guard hub support plate 31 to facilitate securing the seat assembly 168 to the chassis 22.

As best shown in FIG. 10, the seat member 170 has a lower surface that is shaped generally to mate with the seat portion 26 of the chassis 22. The lower surface has a notch 182 to receive the upward fold 56 of the seat plate 32 (FIG. 11) and a pair of slots 184 for receiving a foot rest (not shown). The rear end of the seat member 170 is contoured to define a gripping surface 186 which cooperates with the chassis 22 to grip or pinch the webbing of the seat belt 127 when the chassis 22 is secured to the vehicle with the seat belt 127 of the vehicle. More specifically, the rear end of the seat member 170 is shaped to conform to the contour of the bend 44 of the spine 28. The gripping surface 186 preferably is provided with a knurled surface to enhance the grip on the webbing of the seatbelt 127 and thereby alleviate the child restraint apparatus 10 sliding along the webbing of the seatbelt 127 in the case of side impact. Finally, the lower surface is provided with a retractor cavity 188 in communication with the slot 178 of the horn 176. The seat member 176 is preferably molded from a suitable polymeric material, such as polypropylene or the like.

Figure 13:
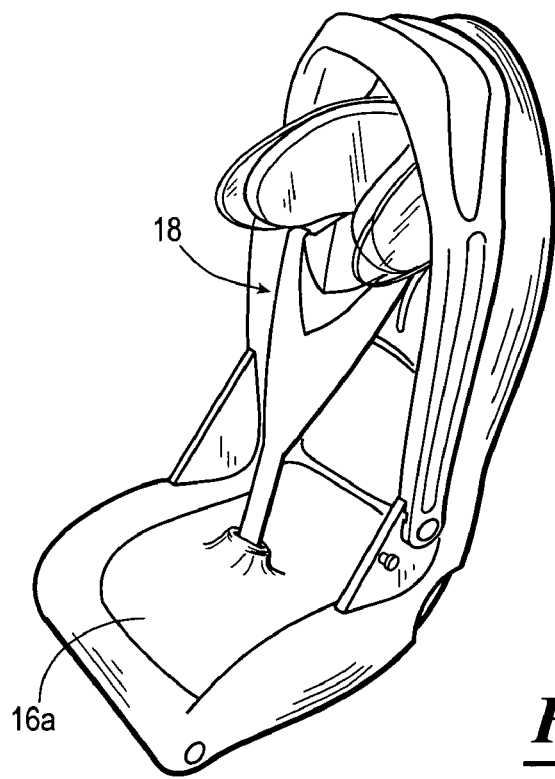
FIG. 13 is a perspective view of the child restraint apparatus of the present invention showing the guard in an up position and the harness assembly in the latched position.

Referring to FIGS. 11–13, the harness assembly 172 includes a retractor assembly 190 (FIG. 11) and a torso strap 192 (FIGS. 11–13). The retractor assembly 190 has a mounting plate 194 with an opening 196. The retractor assembly 190 is secured to the seat member 170 with the retractor assembly 190 positioned in the retractor cavity 188. The retractor assembly 190 is secured to the seat member 170 via the mounting plate 194 in a suitable fashion, such as with a rivet 196. The retractor assembly 190 preferably is an automatic locking retractor so that any slack, roping, or entanglements of the torso strap 192 are markedly reduced. This also maintains the size appropriate degree of tension on the torso strap 192 to assure its proper placement during use.

The torso strap 192 has a substantially Y-shape configuration with a lower end 198 fixed to the retractor assembly 190 and a pair of upper ends 200. The torso strap 192 extends up between the passenger's legs and the upper ends 200 have shoulder latch plates 202 (FIG. 12) that attach to the head protection assembly 20 above the child passenger's shoulder level thereby assuring proper placement and optimal safety. Further, the latch plates 202 extend sufficiently to accommodate the child passenger's shoulders, thereby the torso strap 192 is positioned against the chest of the passenger while not impinging or putting pressure on the chest to provide comfort for the passenger while establishing an enhanced, immediate protection zone for the passenger.

To prevent the use of a seat assembly that is inappropriately sized for a child, the torso strap 192 preferably has a length such that the torso strap 192 may not be connected to the head protection assembly 20 when the child reaches a particular size, thus requiring use of a seat assembly of proper size. The torso strap 192 is preferably fabricated of an energy absorbing material, such as neoprene or the like. The combination of design and materials create a system that will spread forces in an effort to minimize chest and clavicular injury for the child passenger. The outer support structure 24 may further include torso flaps (not shown) of similar harness material to provide additional security for the passenger's lower thorax and upper leg regions.

Referring again to FIG. 11, to connect the seat assembly 168 to the base 12, the landings 180 are positioned under the horizontal portions of the lower tabs 50 of the guard hub support plate 31. The seat assembly 16a is then pushed downwardly to engage the mounting plate 194 of the retractor assembly 190 with the catch assembly 60 of the seat latch assembly 36. With the seat assembly 16a connected to the chassis 22, the lower surface cooperates with the bend 44 of the spine 28 to grip the webbing of the seat belt 127 when one is used to secure the base 12 to the vehicle. The seat assembly 16a is removed from the base 12 by pulling the release handle 64 causing the catch assembly 60 to disengage the mounting plate 194 of the retractor assembly 190. It will be appreciated that to accommodate growing children, the forward facing seat assemblies will differ from one another in dimension whereby a seat member for a smaller child would be taller than a seat member for a larger child and the saddle would be smaller to conform to the bottom of the smaller child. In addition, the torso strap of the harness assembly used with a seat assembly for a smaller child will be shorter than that used for a larger child.

FIG. 14 illustrates a rear-facing seat assembly in the form of an infant carrier 204. The infant carrier 204 preferably has a seating configuration to optimize ease of breathing and thereby increasing blood oxygenation and comfort for the infant passenger. The infant carrier 204 may be constructed to have a harness assembly (not shown) similar in construction to the harness assembly 18 described above and torso flaps (not shown), with the exception that the infant carrier 204 is provided with latch mechanisms near the shoulders of the passenger. Further, the infant carrier 204 may be constructed to have a ribbed front end 206 to facilitate the transferring of impact loads in cooperation with the guard 14 from the infant carrier 204 to the seat plate 32 of the chassis 22 via the upward fold 56 of the seat plate 32.

Like the seat member 170, the infant carrier 204 is formed to have a pair of landings 208 that are adapted to engage the underside of the horizontal portions of the lower tabs 50 of the guard hub support plate 31. The rear end of the infant carrier 204 is further shaped to conform to the contour of the bend 44 of the spine 28. The lower surface may be provided with a retractor assembly with a mounting plate or simply a mounting plate if a retractor assembly is not utilized.

In use, the infant carrier 204 with infant is guided onto the seat plate 32 of the chassis 22 until the connections click into a locked position. The guard 14 is then lowered and securely latched. Latching and unlatching of the guard 14 is a simple one-hand operation concurrent with raising and lowering. This procedure would be repeated for any other rear-facing seat assembly or forward-facing seat assembly.

Figure 15:
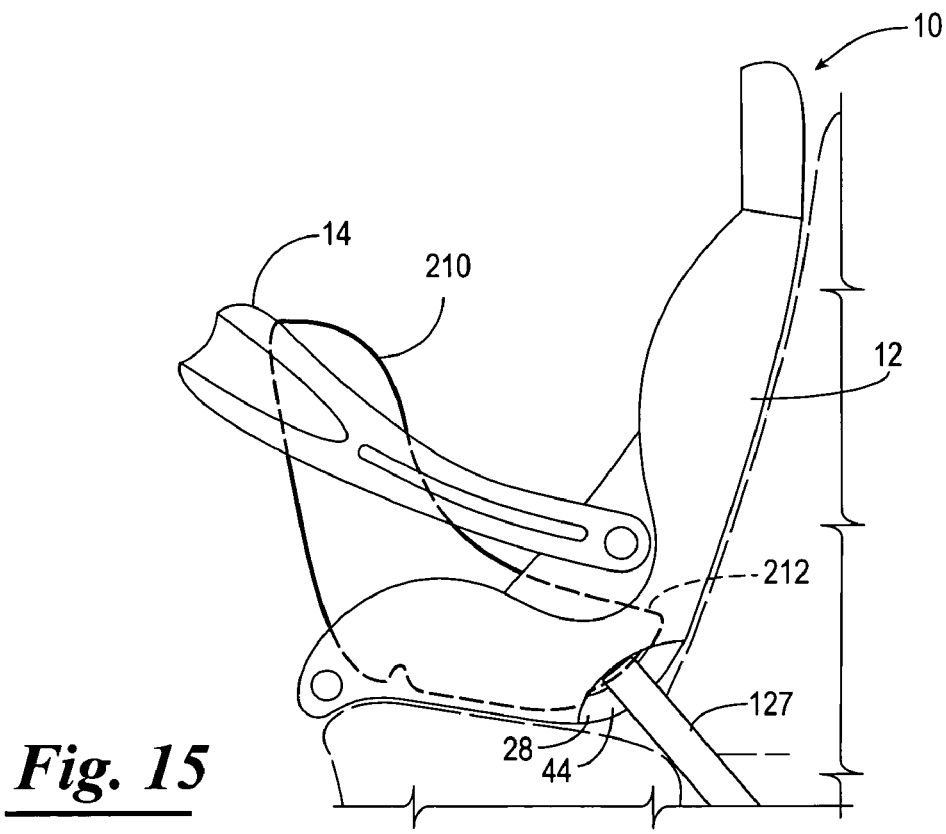
FIG. 15 is a side elevational view of the child restraint apparatus illustrating another embodiment of a rear-facing seat assembly.

FIG. 15 illustrates another embodiment of a rear-facing seat assembly 210. The seat assembly 210 is similar in construction to the infant carrier 204 described above except that the seat assembly 210 is constructed to support a larger child passenger in a more upright posture. Like the infant carrier 204, the seat assembly 210 has a harness assembly (not shown) and is formed to have a pair of landings 212 that are adapted to engage the underside of the horizontal portions of the lower tabs 50 of the guard hub support plate 31. The rear end of the seat assembly 210 is further shaped to conform to the contour of the bend 44 of the spine 28.

Figure 16:
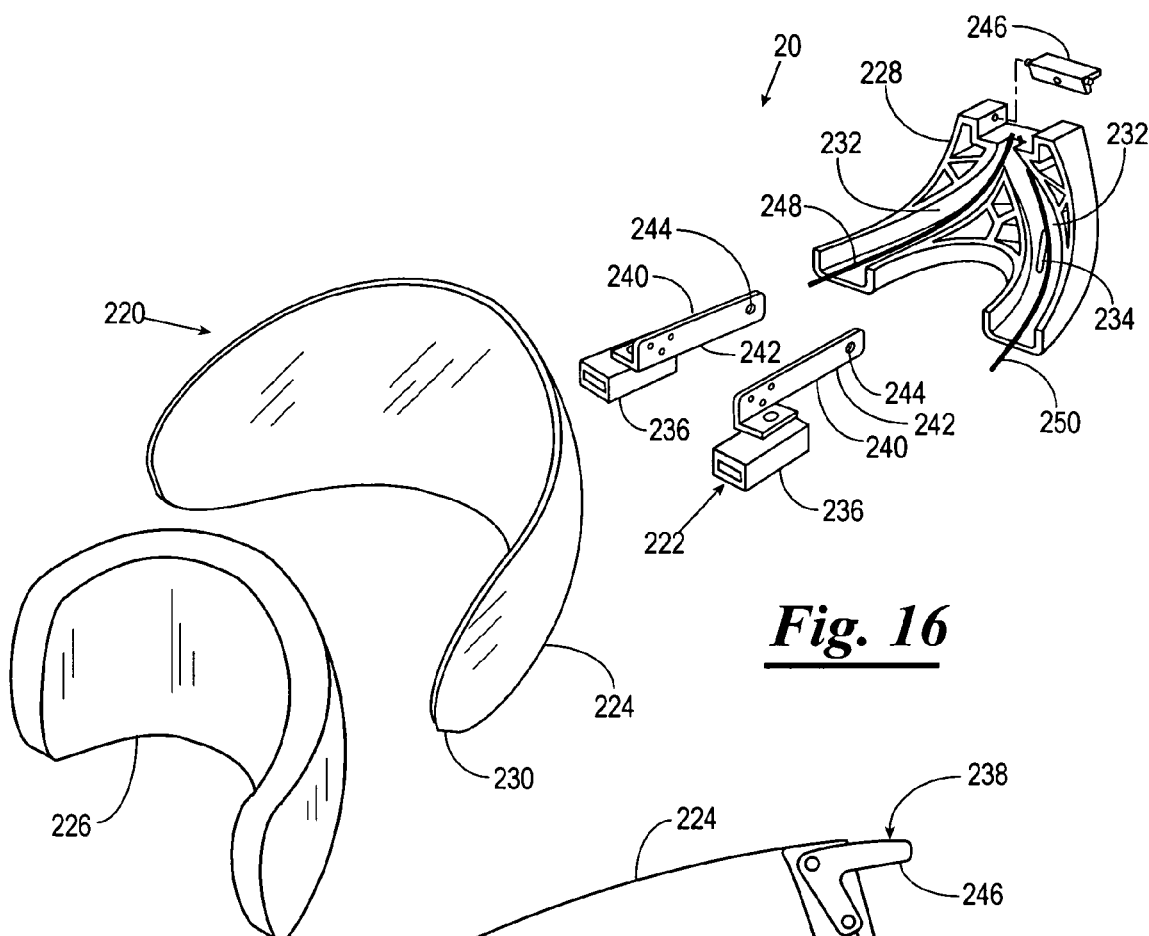
FIG. 16 is an exploded, perspective view of a head protection assembly.
Figure 17:
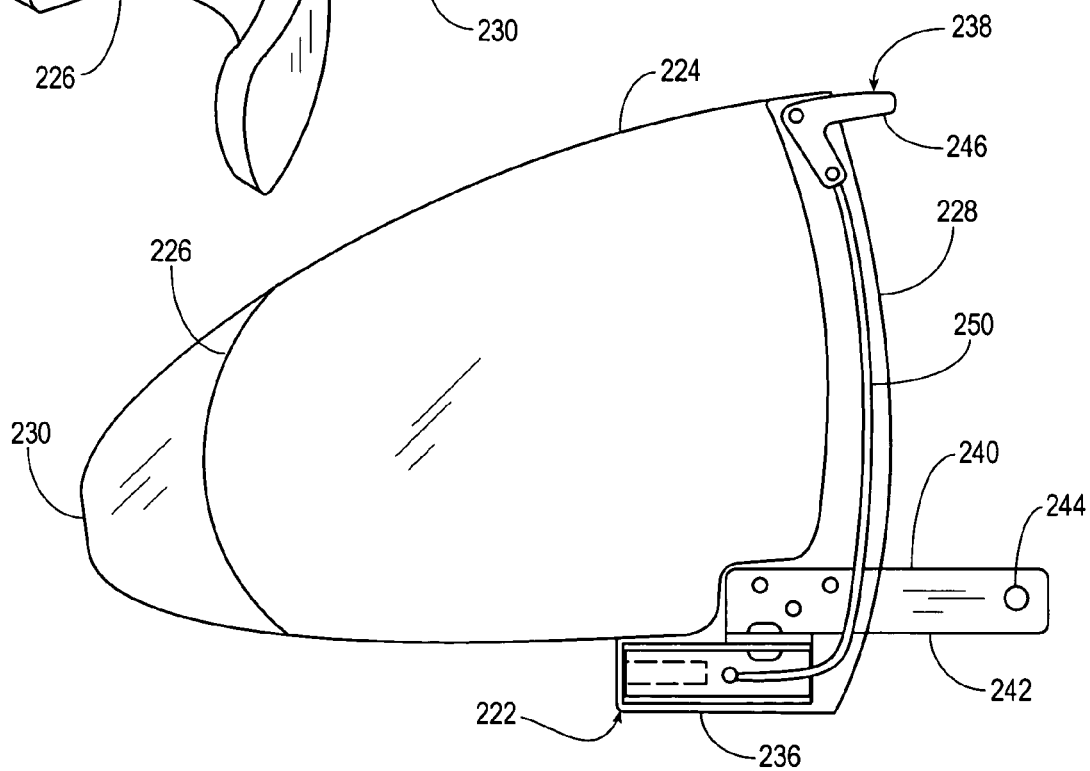
FIG. 17 is a side elevational view of the head protection assembly.
Figure 18:
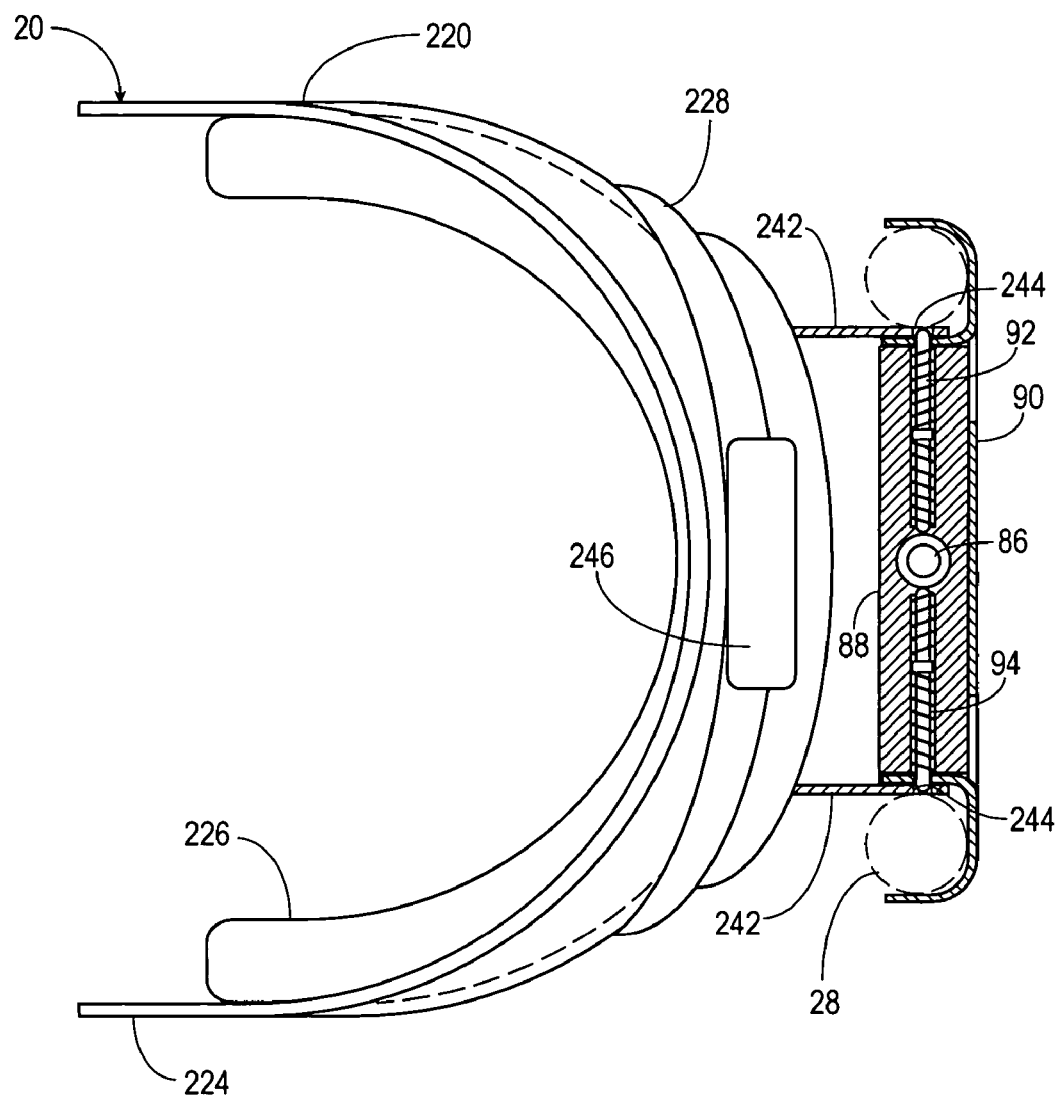
FIG. 18 is a partial cross sectional, top plan view of the head protection assembly shown connected to the actuator assembly of the chassis.

Referring now to FIGS. 16–18, the head protection assembly 20 is utilized in combination with the forward-facing seat assemblies such as the seat assembly 16a. The head protection assembly 20 is sized to receive the child's head to create a protection zone around the child passenger's head which shields against outside intrusion. Further, the head protection assembly 20 receives the upper ends 200 of the torso strap 192 and is adjustable so that the position of the head protection assembly 20 and the torso strap 192 may be correctly positioned. Broadly, the head protection assembly 20 includes a helmet 220 shaped to cradle the head of the child and a latch assembly 222 connected to the helmet 220 for receiving the upper ends 200 of the torso strap 192 to secure the torso strap 192 about the child.

Referring to FIG. 16, the helmet 220 includes a shell 224, padding 226 positioned on the interior surface of the shell 224, and a housing 228 connected to a rear end of the shell 224. The shell 224 may be constructed of any hard material resistant to impact. However, the shell 224 is preferably constructed of a clear, rigid material, such as polycarbonate or the like. The shell 224 is substantially U-shaped so as to have forward ends 230 which will extend beyond the front of the child's head to absorb and deflect energy from intruding objects while being void of padding 226 so as to be transparent so as to not unduly impede the child's peripheral vision. The shell 224 may also incorporate speakers to interface with audio, visual, audio-visual, and electronic gaming devices.

The padding 226 is an energy absorbing material that is soft enough to function as a pillow on long trips. The padding 226 is contoured to conform to the general form of the child passenger's head so that it will provide additional support around the neck to minimize the potential for injury. The padding 226 is further contoured to cradle the child passenger's head safely during side and oblique impacts while providing minimal visual obstruction to the passenger.

The housing 228 is secured to the rear side of the shell 224 and serves to house the latch assembly 222. The housing 228 has a pair of cable receiving channels 232 and a pair of slots 234 (only one of the slots 234 depicted in FIG. 16).

The latch assembly 222 includes a pair of latch mechanisms 236 and a latch release assembly 238 operably connected to each of the latch mechanisms 236 for releasing the upper ends 200 of the torso strap 192. The latch mechanisms 236 may be any suitable latch mechanism adapted to interlock with the latch plates 202 of the upper ends 200 of the torso strap 192. The latch mechanisms 236 are positioned on each side of the helmet 220 on the lower side thereof and set back so that the torso strap 192 is positioned against the chest while not impinging or putting pressure on the chest of the child when the upper ends 200 of the torso strap 192 are secured in the latch mechanisms 236. The latch mechanisms 236 are mounted on either side of the helmet 220 via a pair of mounting brackets 240. More specifically, the latch mechanisms 236 are connected to the mounting brackets 240 which are in turn connected to the housing 228. The mounting brackets 240 further function as structure for connecting the helmet 220 to the actuator assembly 34 of the chassis 22. To this end, each of the mounting brackets 240 has a tang 242 which are shaped to extend through the slots 234 of the housing 228 and dimensioned to be received in the slots 108 and 110 of traveling block 88. Each of the tangs 242 has a pin receiving opening 244 for receiving the ends of the retention pins 92 and 94 of the actuator assembly 34.

The latch release assembly 238 preferably includes a single release handle 246 connected to an upper end of the housing 228 of the helmet 220. The release handle 246 is interconnected to the latch mechanisms 236 via a first cable 248 having a one end connected to the release handle 246 and the other end connected to one of the latch mechanisms 236 and a second cable 250 having one end connected to the release handle 246 and a the other end connected to the other latch mechanism 236. The release handle 246 is preferably positioned on or near the upper end of the helmet 220 to prevent the child occupant from inadvertently releasing the torso strap 192.

Like the seat assemblies, the head protection assembly 20 preferably is constructed in a variety of sizes to allow the use of the head protection assembly 20 that best accommodates the size of the child passenger. As such the head protection assembly 20 is selectively detachable from the chassis 22. With reference to FIGS. 5, 5A, and 18, to attach the head protection assembly 20 to the chassis 22, the harness assembly 18 is detached from the head protection assembly 20, and the traveling block 88 is moved to the unlocked position (FIG. 5) by rotating the jackscrew 86 until the retention pins 92 and 94 are adjacent the area of reduced diameter 96. With the retention pins 92 and 96 urged inwardly so as to function as quick connectors, the tangs 242 of the head protection assembly 20 are inserted into the slots 108 and 110 of the traveling block 88 until the retention pins 92 and 94 snap into the pin receiving holes 244 of the tangs 242. With the tangs 242 secured in place, the traveling block 88 is moved to the locked position wherein the traveling block 88 is moved away from the area of reduced diameter 96 to cause the retention pins 92 and 94 to engage the jackscrew 86 and thereby extend further through the pin receiving holes 244 of the tangs 242 to secure the head protection assembly 20 to the chassis 22 and thereby function as shear pins. It will be appreciated that another advantage of the design is that if the tangs 242 have not properly positioned to receive the retention pins 92 and 94, the traveling block 88 may not be moved to the locked position. By securing the head protection assembly 20 to the chassis 22, the torso strap 192 is tied to the chassis 22. That is, upon the occurrence of an accident, the child passenger loads the torso strap 192, the torso strap 192 loads the head protection assembly 20, and the head protection assembly 20 loads the retention plate 90 which loads the spine 28.

The head protection assembly 20 is detached from the chassis 22 by moving the traveling block 88 to the unlocked position (FIG. 5A) wherein the head protection assembly 20 may be pulled from the slots 108 and 110 of the traveling block 88 due to the quick connect functionality of the retention pins 92 and 94 when in the unlocked position.

After the head protection assembly 20 is secured to the chassis 22, the actuator assembly 34 (FIG. 2) is used to properly position the head protection assembly 20 for the child passenger. The head protection assembly 20 is properly positioned along the chassis 22 when a lower end of the head protection assembly 20 is positioned just above the shoulders of the child passenger. The knob 95 affixed to the upper end of the jackscrew 86 is located in a remote location behind the passenger to prevent tampering by the passenger.

The child restraint apparatus 10 of the present invention has the advantage of being simple to install and use while providing a size appropriate protection zone around a child passenger. The base 12 is easy to install in a vehicle and provides a solid foundation with a roll bar to manage intrusions from rollover impacts. The size appropriate seat assemblies 16 are designed to grow with the child and are secured to the base 12 to maximize passenger safety and comfort. The guard 14 extends from the base 12 and creates a protection barrier around the child passenger. The head protection assembly 20 shields the child's head and neck from intrusions. Finally, the child is secured via the harness assembly 18 which interlocks with the head protection assembly 20 in one step and assures proper placement, thereby mitigating harness misuse errors.

While the child restraint apparatus 10 has been described to include the combination of the base 12, the guard 12, the seat assemblies 16 with the harness assembly 18, and the head protection assembly 20, it will be appreciated that each of these components may be individually incorporated into a child restraint system. For example, the harness assembly 18 may be incorporated into a child restraint system having a seat integrally formed with a base or support structure. Similarly, the head protection assembly 20 and the guard 14 as described herein may be used in previously known child restraint systems.

From the above description, it is clear that the present invention is well adapted to carry out the objects and to attain the advantages mentioned herein as well as those inherent in the invention. While presently preferred embodiment of the invention has been described for purposes of this disclosure, it will be understood that numerous changes may be made which will readily suggest themselves to those skilled in the art and which are accomplished within the spirit of the invention disclosed and claimed.

What is claimed is:

1. A restraint apparatus for a child, comprising:
   a base connectable to a vehicle, the base having a chassis with a back portion and a seat portion;
   a seat member connected to the seat portion of the chassis;
   a harness assembly comprising a torso strap having a lower end and a pair of upper ends, the lower end of the torso strap connected to the chassis and positionable between the legs of the child;
   a substantially U-shaped guard having a first end and a second end pivotally connected to the chassis so as to be movable between an up position and a down position, in the down position the guard forming a frontal and lateral barrier around the child, the guard having a longitudinal groove extending from a leading end toward the first end and the second end along an exterior thereof for receiving a portion of a guard of an adjacently positioned restraint apparatus;
   a helmet connected to the chassis, the helmet having a rigid shell shaped to extend about at least a portion the head of the child; and
   a latch assembly for releasably receiving the upper ends of the torso strap, the latch assembly connected to the helmet.

2. The restraint apparatus of claim 1, wherein the latch assembly comprises:
   a pair of latch mechanisms adapted to receive the upper ends of the torso strap to secure the torso strap about the child; and a latch release assembly operably connected to each of the latch mechanisms for releasing the upper ends of the torso strap, the latch release assembly including a single release handle.

3. The restraint apparatus of claim 2, wherein the release handle is connected to connected to an upper end of the helmet.

4. The restraint apparatus of claim 1, wherein the latch assembly comprises:
a pair of latch mechanisms adapted to receive the upper ends of the torso strap to secure the torso strap about the child; and
a latch release assembly operably connected to each of the latch mechanisms for releasing the upper ends of the torso strap, the latch release assembly comprising:
a single release handle connected to an upper end of the helmet;
a first cable having a first end connected to the release handle and a second end connected to one of the latch mechanisms; and
a second cable having a first end connected to the release handle and a second end connected to the other latch mechanism.

5. The restraint apparatus of claim 1, wherein the helmet is moveable longitudinally along the back portion of the chassis.

6. The restraint apparatus of claim 1 wherein the helmet is moveable longitudinally along the back portion of the chassis between an locked position wherein the helmet is secured to the chassis and an unlocked position wherein the helmet is detachable from chassis, and wherein the torso strap of the harness assembly has a length such that the upper ends of the torso strap are non-extendible to the latch assembly when the helmet is moved to the unlocked position to render the harness assembly inoperable when the helmet is in the unlocked position.

7. The restraint apparatus of claim 1, wherein the torso strap of the harness assembly is substantially Y-shaped.

8. The restraint apparatus of claim 1, wherein the harness assembly further comprises a retractor assembly connected to the chassis, and wherein the lower end of the torso strap is fixed to the retractor assembly.

9. The restraint apparatus of claim 8, wherein the retractor assembly is connected to the seat member and wherein the retractor member and the seat member are detachable from the chassis.

10. The restraint apparatus of claim 1, wherein the seat member is detachable from the chassis.

11. The restraint apparatus of claim 1, wherein in the down position the guard extending at an angle so as to be oriented substantially perpendicularly to a back of a front seat of the vehicle upon the front seat rotating backwards when the seat is connected to a rear seat of the vehicle to prevent the front seat from collapsing onto the child.

12. A restraint apparatus for a child, comprising:
a base connectable to a vehicle, the base having a chassis with a back portion and a seat portion;
a seat member connected to the seat portion of the chassis;
a harness assembly comprising a torso strap having a lower end and a pair of upper ends, the lower end of the torso strap connected to the chassis and positionable between the legs of the child;
a substantially U-shaped guard having a first end and a second end pivotally connected to the chassis so as to be movable between an up position and a down position, in the down position the guard forming a frontal and lateral barrier around the child, wherein the guard has a front end and wherein the front end of the guard has a pair of side scoops to facilitate positioning of the guard between front seats of the vehicle when the chassis is secured in the center of a rear seat of the vehicle;
a helmet connected to the chassis, the helmet having a rigid shell shaped to extend about at least a portion the head of the child; and
a latch assembly for releasably receiving the upper ends of the torso strap, the latch assembly connected to the helmet.

13. A restraint apparatus for a child, comprising:
a base connectable to a vehicle, the base having a chassis with a back portion and a seat portion;
a seat member connected to the seat portion of the chassis;
a harness assembly comprising a torso strap having a lower end and a pair of upper ends, the lower end of the torso strap connected to the chassis and positionable between the legs of the child;
a substantially U-shaped guard having a first end and a second end pivotally connected to the chassis so as to be movable between an up position and a down position, in the down position the guard forming a frontal and lateral barrier around the child, wherein the guard has a latch mechanism for locking the guard in the up position and the down position, wherein the latch mechanism comprises:
a hub connected to the seat;
a spring-loaded pin mateable with the hub to lock the guard in the up position and the down position, the spring-loaded pin being substantially vertically oriented when the guard is in the down position to minimize inertial effects on the spring-loaded pin; and
a release handle connected to the spring-loaded pin for disengaging the spring-loaded pin from the hub;
a helmet connected to the chassis, the helmet having a rigid shell shaped to extend about at least a portion the head of the child; and
a latch assembly for releasably receiving the upper ends of the torso strap, the latch assembly connected to the helmet.

14. A restraint apparatus for a child, comprising:
a base connectable to a vehicle, the base having a chassis with a back portion and a seat portion;
a seat member connected to the seat portion of the chassis;
a harness assembly comprising a torso strap having a lower end and a pair of upper ends, the lower end of the torso strap connected to the chassis and positionable between the legs of the child;
a helmet connected to the chassis, the helmet having a rigid shell shared to extend about at least a portion the head of the child; and
a latch assembly for releasably receiving the upper ends of the torso strap, the latch assembly connected to the helmet,
wherein the chassis has an upper end extending above the helmet so as to function as a roll bar to provide protection in the event the vehicle rolls over.

15. A restraint apparatus for a child, comprising:
a base connectable to a vehicle, the base having a chassis;
a rear-facing seat assembly detachably connectable to the chassis; and
a forward-facing seat assembly detachably connectable to the chassis, the forward-facing seat assembly comprising:

a forward-facing seat member having a horn formed on an upper surface of the seat member to impede longitudinal movement of the child along the seat member, the horn having a slot;
a harness assembly, the harness assembly comprising:
  a retractor assembly connected to the forward-facing seat member; and
  a torso strap having a lower end and a pair of upper ends, the lower end of the torso strap fixed to the retractor assembly, extending through the slot formed in the horn, and positionable between the legs of the child; and
a latch assembly connected to the back portion of the seat, the latch assembly releasably receiving the upper ends of the torso strap to secure the torso strap about the child,
wherein the rear-facing seat assembly and the forward-facing seat assembly may be used interchangeably with the chassis.

16. The restraint apparatus of claim 15, wherein the rear-facing seat assembly comprises:
a rear-facing seat member; and
a harness assembly connected to the rear-facing seat member.

17. The restraint apparatus of claim 16, wherein the chassis may be secured to the vehicle with a seat belt having a webbing, and wherein the rear-facing seat member has a rear end contoured to cooperate with the chassis to grip the webbing of the seat belt when the chassis is secured to the vehicle with the seat belt of the vehicle.

18. The restraint apparatus of claim 17, further comprising a web tightening assembly connected to the chassis for tightening the webbing of the vehicle.

19. The restraint apparatus of claim 15, wherein the chassis may be secured to the vehicle with a seat belt having a webbing, and wherein the forward-facing seat member has a rear end contoured to cooperate with the chassis to grip the webbing of the seat belt when the chassis is secured to the vehicle with the seat belt of the vehicle.

20. The restraint apparatus of claim 19, further comprising a web tightening assembly connected to the chassis for tightening the webbing of the vehicle.

21. The restraint apparatus of claim 15, wherein the chassis may be connected to the vehicle with a seat belt having a webbing and wherein the restraint apparatus further comprises a web tightening assembly connected to the chassis for tightening the webbing of the vehicle.

22. The restraint apparatus of claim 15 further comprising:
a substantially U-shaped guard having a first end and a second end pivotally connected to the chassis so as to be movable between an up position and a down position, in the down position the guard forming a frontal and lateral barrier around the child.

23. The restraint apparatus of claim 22, wherein in the down position the guard extending at an angle so as to be oriented substantially perpendicularly to a back of a front seat of the vehicle upon the front seat rotating backwards when the seat is connected to a rear seat of the vehicle to prevent the front seat from collapsing onto the child.

24. A restraint apparatus for a child, comprising:
a base connectable to a vehicle, the base having a chassis;
a rear-facing seat assembly detachably connectable to the chassis;
a forward-facing seat assembly detachably connectable to the chassis, wherein the rear-facing seat assembly and the forward-facing seat assembly may be used interchangeably with the chassis; and
a substantially U-shaped guard having a first end and a second end pivotally connected to the chassis so as to be movable between an up position and a down position, in the down position the guard forming a frontal and lateral barrier around the child, wherein the guard has a longitudinal groove extending from a leading end toward the first end and the second end along an exterior thereof for receiving a portion of a guard of an adjacently positioned restraint apparatus.

25. A restraint apparatus for a child, comprising:
a base connectable to a vehicle, the base having a chassis;
a rear-facing seat assembly detachably connectable to the chassis;
a forward-facing seat assembly detachably connectable to the chassis, wherein the rear-facing seat assembly and the forward-facing seat assembly may be used interchangeably with the chassis; and
a substantially U-shaped guard having a first end and a second end pivotally connected to the chassis so as to be movable between an up position and a down position, in the down position the guard forming a frontal and lateral barrier around the child, wherein the guard has a front end and wherein the front end of the guard has a pair of side scoops to facilitate positioning of the guard between front seats of the vehicle when the chassis is secured in the center of a rear seat of the vehicle.

26. A restraint apparatus for a child, comprising:
a base connectable to a vehicle, the base having a chassis;
a rear-facing seat assembly detachably connectable to the chassis;
a forward-facing seat assembly detachably connectable to the chassis, wherein the rear-facing seat assembly and the forward-facing seat assembly may be used interchangeably with the chassis; and
a substantially U-shaped guard having a first end and a second end pivotally connected to the chassis so as to be movable between an up position and a down position, in the down position the guard forming a frontal and lateral barrier around the child, wherein the guard has a latch mechanism for locking the guard in the up position and the down position, wherein the latch mechanism comprises:
  a hub connected to the seat;
  a spring-loaded pin mateable with the hub to lock the guard in the up position and the down position, the spring-loaded pin being substantially vertically oriented when the guard is in the down position to minimize inertial effects on the spring-loaded pin; and
  a release handle connected to the spring-loaded pin for disengaging the spring-loaded pin from the hub.

27. A restraint apparatus for a child, comprising:
a base connectable to a vehicle, the base having a chassis;
a first forward-facing seat assembly detachably connectable to the chassis; and
a second forward-facing seat assembly detachably connectable to the chassis,
wherein the first forward-facing seat assembly and the second forward-facing seat assembly are different in size and may be used interchangeably with the chassis.

28. The restraint apparatus of claim 27, wherein the chassis has an upper end extending above the helmet so as to function as a roll bar to provide protection in the event the vehicle rolls over.

29. The restraint apparatus of claim 27, wherein each of the first and second forward-facing seat assemblies comprises:
- a forward-facing seat member; and
- a harness assembly, the harness assembly comprising:
    - a retractor assembly connected to the forward-facing seat member; and
    - a torso strap having a lower end and a pair of upper ends, the lower end of the torso strap fixed to the retractor assembly and positionable between the legs of the child; and
- a latch assembly connected to the back portion of the seat, the latch assembly releasably receiving the upper ends of the torso strap to secure the torso strap about the child.

30. The restraint apparatus of claim 29, wherein the chassis may be secured to the vehicle with a seat belt having a webbing, and wherein the seat members of the first and second forward-facing seat assemblies have a rear end contoured to cooperate with the chassis to grip the webbing of the seat belt when the chassis is secured to the vehicle with the seat belt of the vehicle.

31. The restraint apparatus of claim 30, further comprising a web tightening assembly connected to the chassis for tightening the webbing of the vehicle.

32. The restraint apparatus of claim 29 wherein the seat member of each of the first and second forward-facing seat assemblies each has a slot through which the torso strap of the harness assembly slidably extends.

33. The restraint apparatus of claim 32, wherein the slot extends through a horn formed on an upper surface of the seat member to impede longitudinal movement of the child along the seat member.

34. The restraint apparatus of claim 27, wherein the chassis may be connected to the vehicle with a seat belt having a webbing and wherein the restraint apparatus further comprises a web tightening assembly connected to the chassis for tightening the webbing of the vehicle.

35. The restraint apparatus of claim 27 further comprising:
- a substantially U-shaped guard having a first end and a second end pivotally connected to the chassis so as to be movable between an up position and a down position, in the down position the guard forming a frontal and lateral barrier around the child.

36. The restraint apparatus of claim 35, wherein in the down position the guard extending at an angle so as to be oriented substantially perpendicularly to a back of a front seat of the vehicle upon the front seat rotating backwards when the seat is connected to a rear seat of the vehicle to prevent the front seat from collapsing onto the child.

37. The restraint apparatus of claim 35, wherein the guard has a longitudinal groove extending from a leading end toward the first end and the second end along an exterior thereof for receiving a portion of a guard of an adjacently positioned restraint apparatus.

38. The restraint apparatus of claim 35, wherein the guard has a front end and wherein the front end of the guard has a pair of side scoops to facilitate positioning of the guard between front seats of the vehicle when the chassis is secured in the center of a rear seat of the vehicle.

39. The restraint apparatus of claim 35, wherein the guard has a latch mechanism for locking the guard in the up position and the down position, wherein the latch mechanism comprises:
- a hub connected to the seat;
- a spring-loaded pin mateable with the hub to lock the guard in the up position and the down position, the spring-loaded pin being substantially vertically oriented when the guard is in the down position to minimize inertial effects on the spring-loaded pin; and
- a release handle connected to the spring-loaded pin for disengaging the spring-loaded pin from the hub.

40. The restraint apparatus of claim 35, wherein the chassis has an upper end extending above the helmet so as to function as a roll bar to provide protection in the event the vehicle rolls over.

41. A restraint apparatus for a child, comprising:
- a seat connectable to a vehicle and having a seat portion and a back portion; and
- a substantially U-shaped guard having a first end and a second end pivotally connected to the back portion of the seat so as to be movable between an up position and a down position, in the down position the guard extending at an angle so as to be oriented substantially perpendicularly to a back of a front seat of the vehicle upon the front seat rotating backwards when the seat is connected to a rear seat of the vehicle to prevent the front seat from collapsing onto the child, wherein the guard has a longitudinal groove extending from a leading end toward the first end and the second end along an exterior thereof for receiving a portion of a guard of an adjacently positioned restraint apparatus.

42. A restraint apparatus for a child, comprising:
- a seat connectable to a vehicle and having a seat portion and a back portion; and
- a substantially U-shaped guard having a first end and a second end pivotally connected to the back portion of the seat so as to be movable between an up position and a down position, in the down position the guard extending at an angle so as to be oriented substantially perpendicularly to a back of a front seat of the vehicle upon the front seat rotating backwards when the seat is connected to a rear seat of the vehicle to prevent the front seat from collapsing onto the child, wherein the guard has a front end and wherein the front end of the guard has a pair of side scoops to facilitate positioning of the guard between front seats of the vehicle when the chassis is secured in the center of a rear seat of the vehicle.

43. A restraint apparatus for a child, comprising:
- a seat connectable to a vehicle and having a seat portion and a back portion; and
- a substantially U-shaped guard having a first end and a second end pivotally connected to the back portion of the seat so as to be movable between an up position and a down position, in the down position the guard extending at an angle so as to be oriented substantially perpendicularly to a back of a front seat of the vehicle upon the front seat rotating backwards when the seat is connected to a rear seat of the vehicle to prevent the front seat from collapsing onto the child, wherein the guard has a latch mechanism for locking the guard in the up position and the down position, wherein the latch mechanism comprises:
    - a hub connected to the seat;
    - a spring-loaded pin mateable with the hub to lock the guard in the up position and the down position, the spring-loaded pin being substantially vertically oriented when the guard is in the down position to minimize inertial effects on the spring-loaded pin; and a release handle connected to the spring-loaded pin for disengaging the spring-loaded pin from the hub.

44. A restraint apparatus for a child, comprising:

a base connectable to a vehicle, the base having a chassis with a back portion and a seat portion;

a substantially U-shaped guard having a first end and a second end pivotally connected to the chassis so as to be movable between an up position and a down position, in the down position the guard forming a frontal and lateral barrier around the child;

a seat member detachably connected to the seat portion of the chassis;

a harness assembly comprising:
  a retractor assembly connected to the seat member; and
  a torso strap having a lower end and a pair of upper ends, the lower end of the torso strap fixed to the retractor assembly and positionable between the legs of the child;

a helmet connected to the chassis, the helmet having a rigid shell shaped to extend about at least a portion the head of the child; and a latch assembly for releasably receiving the upper ends of the torso strap, the latch assembly connected to the helmet, wherein the chassis has an upper end extending above the helmet so as to function as a roll bar to provide protection in the event the vehicle rolls over.

45. The restraint apparatus of claim 44 wherein the upper end of the chassis is oriented substantially vertically when the base is connected to the vehicle.

46. The restraint apparatus of claim 44 further comprising a pair of latch mechanisms connected to the chassis and having a portion extendible therefrom, the latch mechanisms connectable to a bar of the seat of the vehicle.

47. The restraint apparatus of claim 44, wherein the chassis may be connected to the vehicle with a seat belt having a webbing and wherein the restraint apparatus further comprises a web tightening assembly connected to the chassis for tightening the webbing of the vehicle.

* * * * *

UNITED STATES PATENT AND TRADEMARK OFFICE
CERTIFICATE OF CORRECTION

| | | |
|---|---|---|
| PATENT NO. | : 7,246,853 B2 | Page 1 of 1 |
| APPLICATION NO. | : 11/170516 | |
| DATED | : July 24, 2007 | |
| INVENTOR(S) | : John A. Harcourt, William C. Aven and William P. Munsell | |

It is certified that error appears in the above-identified patent and that said Letters Patent is hereby corrected as shown below:

In the Claims:
Claim 14, column 14, line 53: Delete "shared" and replace with -- shaped --.

Signed and Sealed this

Twenty-fifth Day of September, 2007

JON W. DUDAS
*Director of the United States Patent and Trademark Office*